US008881044B2

(12) United States Patent
Bhatt

(10) Patent No.: US 8,881,044 B2
(45) Date of Patent: Nov. 4, 2014

(54) REPRESENTING RANGES OF IMAGE DATA AT MULTIPLE RESOLUTIONS

(75) Inventor: Nikhil Bhatt, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 455 days.

(21) Appl. No.: 13/182,747

(22) Filed: Jul. 14, 2011

(65) Prior Publication Data

US 2013/0019196 A1    Jan. 17, 2013

(51) Int. Cl.
| | | |
|---|---|---|
| G06F 3/048 | (2013.01) | |
| G06T 5/00 | (2006.01) | |
| G06T 5/40 | (2006.01) | |
| G06F 3/01 | (2006.01) | |

(52) U.S. Cl.
CPC .............. *G06F 3/048* (2013.01); *G06T 5/009* (2013.01); *G06T 5/40* (2013.01); *G06T 2207/20016* (2013.01)
USPC ............ 715/771; 715/810; 715/811; 715/833

(58) Field of Classification Search
CPC  G06F 3/04848; G06F 3/0481; G06F 3/04847
USPC ........................... 715/771, 810, 811, 833, 863
See application file for complete search history.

(56) References Cited

U.S. PATENT DOCUMENTS

| | | | |
|---|---|---|---|
| 5,581,370 A | 12/1996 | Fuss et al. | |
| 6,738,161 B1 | 5/2004 | Moriwaki | |
| 7,039,876 B2 * | 5/2006 | Lavendel et al. | 715/777 |
| 7,760,961 B2 * | 7/2010 | Moldvai | 382/274 |
| 2002/0126147 A1 * | 9/2002 | Lavendel et al. | 345/764 |
| 2003/0234810 A1 * | 12/2003 | Gonsalves | 345/744 |
| 2005/0174590 A1 * | 8/2005 | Kubo | 358/1.9 |
| 2006/0153445 A1 * | 7/2006 | Lin | 382/169 |
| 2007/0030506 A1 * | 2/2007 | Takabayashi et al. | 358/1.9 |
| 2007/0036456 A1 | 2/2007 | Hooper | |
| 2007/0165947 A1 | 7/2007 | Paik | |
| 2007/0279500 A1 * | 12/2007 | Castorina et al. | 348/254 |
| 2008/0025635 A1 | 1/2008 | Han et al. | |
| 2008/0130994 A1 * | 6/2008 | Lin | 382/169 |
| 2008/0229232 A1 * | 9/2008 | Schulz et al. | 715/781 |
| 2011/0013039 A1 * | 1/2011 | Aisaka et al. | 348/222.1 |
| 2011/0129148 A1 * | 6/2011 | Kisilev et al. | 382/167 |
| 2012/0127259 A1 * | 5/2012 | Mackie et al. | 348/14.07 |
| 2012/0188414 A1 * | 7/2012 | Ross | 348/241 |

FOREIGN PATENT DOCUMENTS

WO    WO2009029448 A1    3/2009

* cited by examiner

*Primary Examiner* — Nicholas Augustine
(74) *Attorney, Agent, or Firm* — Wong, Cabello, Lutsch, Rutherford & Brucculeri, LLP

(57) ABSTRACT

Methods, systems, and apparatus, including computer programs encoded on computer storage media, are described for representing ranges of image data at multiple resolutions, for example, in the form of a histogram or other suitable graphical representation. In one aspect, the methods include the actions of displaying a graphical representation of image data for a digital image, where the graphical representation has a predetermined range that spans a first range portion and a second range portion. The methods further include the actions of receiving user input requesting to expand image data displayed in the first range portion. In addition, the methods include the actions of modifying display of the graphical representation in response to the received input, to cause the first range portion to visually expand and to cause the second range portion to visually compress.

33 Claims, 9 Drawing Sheets

REPRESENTING RANGES OF IMAGE DATA AT MULTIPLE RESOLUTIONS

BACKGROUND

This specification relates to representing ranges of image data at multiple resolutions, for example, in the form of a histogram or other suitable graphical representation.

A graphical user interface (GUI) of an image processing application can display digital images along with one or more indicators to present information associated with the displayed image. In addition, the GUI can present controls that enable a user of the image processing application to adjust the displayed image based on the information shown by the indicators. FIG. 1A shows an instance of such GUI 100 that displays a view of an image 105. A histogram of the luminance 130 of the image 105 is represented in an indicator 120 of the GUI 100. Bins on the horizontal axis of the histogram indicator 120 represent luminance levels (values) of pixels in the image 105. The scale of the horizontal axis of the luminance histogram 130 has a single resolution over the entire range from 0.0 to 1.0, with bin "0.0" (the first or left-most bin) corresponding to black, and with bin "1.0" (the last or right-most bin) corresponding to white. The right-most bin is the $255^{th}$ bin for an 8-bit image, or the $65,535^{th}$ bin for a 16-bit image. In this example, the image 105 is an image in the RAW format (henceforth a RAW image) which contains extended range data corresponding to luminance levels in the range 1.0-2.0, in addition to image data corresponding to luminance levels in the range of 0.0-1.0. Pixels forming the image 105 that have luminance levels equal to and larger than 1.0 are represented (counted) by the histogram indicator 120 as part of bin "1.0". Thus, for this image 105, the histogram indicator 120 displays a large histogram peak 132 for the luminance level=1.0.

In addition, a control 110 of the GUI 100 is used to adjust exposure of the image 105 by setting the position of a slider 115. The value of the exposure slider 115 depicted in FIG. 1A corresponds to the unadjusted image 105. Adjustment of the image exposure can be performed by the user of the image processing application using slider 115 and based on visual feedback conveyed by the luminance histogram 130. Results of an exposure adjustment are shown in FIG. 1B, where another instance of the GUI 100 displays a view of the adjusted image 105'. In this case, the user set another position of the slider 115' associated with the exposure adjustment control 110. FIG. 1B shows that additional detail has been recovered and is now visible in the highlights of the adjusted image 105' as a result of this exposure adjustment. The indicator 120 now shows a luminance histogram 135 of the adjusted image 105'. The luminance levels of the adjusted image 105' are rescaled (compressed) by a factor proportional to the position of the slider 115', in accordance with the overall darkening of the image. A portion 132' of the luminance histogram 135 associated with the adjusted image 105' corresponds to the peak 132 of the luminance histogram 130 associated with the image 105 prior to the exposure adjustment. The fact that the luminance histogram 135 associated with the adjusted image 105' is distributed over most of the histogram portion 132', as shown in the indicator 120, correlates to the noted additional detail that was recovered in the highlights of the adjusted image 105'.

SUMMARY

Technologies described in this specification can be used to represent ranges of image data at multiple resolutions. For example, the described technologies enable a user to increase a resolution for a range of a histogram associated with a digital image that contains image data above 1.0, e.g. a RAW image, to view information corresponding to image data outside original bounds 0.0-1.0 of the histogram of the image data without using additional screen real estate. A user can then optimally adjust exposure settings for the digital image based on information identified by displaying all available data in the digital image, including extended range data. As another example, a histogram of image data associated with a digital image can be divided into multiple histogram ranges, and the resolution of each histogram range can be adjusted to optimally display the image data associated with each of the ranges. Additionally, the technologies disclosed in this specification can be used to programmatically specify resolutions corresponding to the extended and non-extended data ranges of a digital image when extended range data is identified within the image data associated with the digital image.

In general, one aspect of the subject matter described in this specification can be implemented in methods that include the actions of displaying a graphical representation of image data for a digital image, where the graphical representation has a predetermined range that spans a first range portion and a second range portion. The methods further include the actions of receiving user input requesting to expand image data displayed in the first range portion. In addition, the methods also include the actions of modifying display of the graphical representation in response to the received input, to cause the first range portion to visually expand and to cause the second range portion to visually compress.

The foregoing and other implementations can each optionally include one or more of the following features, alone or in combination. In some implementations, the methods can include the actions of depicting resolved features of the expanded image data displayed in the visually expanded first range portion that were unresolved in the first range portion, and receiving user input to selectively adjust the digital image based on the resolved features of the expanded image data. In some implementations, the first and second range portions can be mutually exclusive. Additionally, the visually expanded first range portion and the visually compressed second range portion also can be mutually exclusive. In some implementations, the graphical representation of the image data includes a histogram of the image data, such that the histogram has a predetermined quantity of histogram bins. For example, if image data of the digital image includes extended range data having values >1.0, e.g. as in the case of a RAW image, then the image data displayed in the first range portion is the extended range data of the digital image, and the first range portion includes one bin corresponding to the last bin of the predefined quantity of histogram bins.

In some implementations, the first range portion and the second range portion can be adjacent. In addition, the sum of the first range portion and the second range portion equals a range of the image data. In some implementations, the image data is luminance. Further, the image data is any one of red (R), green (G) or blue (B) channels. Furthermore, the image data is a combination of R, G and B channels.

According to another aspect, the described subject matter can also be implemented as systems that include a display device, one or more computers and one or more storage devices storing instructions that are operable, when executed by the one or more computers, to cause the system to perform operations including displaying an indicator on the display device, such that the indicator represents a histogram of luminance associated with a digital image, where the histogram indicator has a predetermined histogram range. The luminance includes a luminance portion represented in the histogram indicator over a first histogram range, and another luminance portion represented in the histogram indicator over a second histogram range, such that the first and second histogram ranges have no overlap. The operations further include receiving user input requesting to expand the first histogram range over which the luminance portion is represented by a specified range, and in response to the received input, refreshing the histogram indicator while maintaining the predetermined histogram range. Refreshing the histogram indicator includes expanding by the specified range the first histogram range over which the luminance portion is represented, and compressing by the specified range the second histogram range over which the other luminance portion is represented, such that the expanded first histogram range and the compressed second histogram range have no overlap. Furthermore, the operations include depicting resolved features of the luminance portion represented in the expanded first histogram range that were unresolved when the luminance portion was represented in the first histogram range, and receiving user input to selectively adjust the digital image based on the resolved features of the luminance portion.

The foregoing and other implementations can each optionally include one or more of the following features, alone or in combination. In some implementations, the image data of the digital image includes extended data having values >1.0, e.g. in the case of a RAW image. In these implementations, the portion of the image data corresponds to the extended data of the digital image, and the first histogram range includes one bin at the upper end of the predetermined histogram range. In some implementations, the first histogram range and the second histogram range can be adjacent. In addition, the sum of the first histogram range and the second histogram range can equal the predetermined histogram range.

According to another aspect, the described subject matter can also be implemented as a non-volatile computer storage medium encoded with a computer program, such that the program includes instructions that when executed by one or more computers cause the one or more computers to perform operations including determining that image data associated with a digital image includes predefined image data. Further, the operations include representing a histogram of the image data in response to determining that the image data includes the predefined image data, such that a part of the histogram corresponding to the predefined image data is represented at a specified resolution over at least two adjacent histogram bins and another part of the histogram corresponding to the image data different from the predefined image data is represented at another resolution over at least two other adjacent histogram bins, where the specified resolution is different from the other resolution.

The foregoing and other implementations can each optionally include one or more of the following features, alone or in combination. In some implementations, the operations can further include analyzing the predefined image data, and specifying the resolution used to represent the part of the histogram corresponding to the predefined image data based on the analysis. In other implementations, the resolution used to represent the part of the histogram corresponding to the predefined image data can be pre-specified.

In some implementations, the image data can be luminance. The predefined image data can be the luminance having values in an extended range 1.0–x, e.g. for a RAW image, where x=2.0, 3.0, 4.0, etc., and the image data different from the predefined image data is the luminance having values in a non-extended range 0.0-1.0. In addition, the operations include determining that image data associated with another digital image only includes luminance values in the non-extended range 0.0-1.0. In such case, the operations can further include representing the histogram of the luminance associated with the other digital image at a resolution that is between the specified resolution and the other resolution.

According to another aspect, the described subject matter can also be implemented as systems that include a display device, one or more computers and one or more storage devices storing instructions that are operable, when executed by the one or more computers, to cause the system to perform operations including determining that image data associated with a digital image includes image data values larger than 1.0. Such digital images can be referred to as RAW images. For instance, a total range of image data values associated with a RAW image can be [0, x], where "x"=2.0, 3.0, 4.0, etc. The operations also include representing, in response to the foregoing determination, the image data associated with the digital image in a histogram indicator displayed on the display device. The histogram indicator has a predetermined quantity of histogram bins "N", where each of the histogram bins corresponds to one or more image data values. A portion of the image data associated with the digital image that includes image data values in an extended range (1.0, x] is represented over a specified quantity of the histogram bins "k" that is greater than or equal to two adjacent histogram bins, k≥2, and less than a quantity of bins "K" corresponding to a fraction of the predetermined quantity of histogram bins "N" equal to a ratio of the extended range to the total range of image data values, k<K=N*(x−1.0)/(x−0). In case the digital image is a RAW image having a total range of image data values of [0, 2], the portion of the image data associated with the RAW image that includes image data values in the extended range (1.0-2.0] can be represented over a specified quantity of the histogram bins "k" that is greater than or equal to two adjacent histogram bins, k≥2, and less than half of the predetermined quantity of histogram bins N/2. Further, the operations include depicting resolved features of the portion of the image data represented over the specified quantity of the histogram bins in the histogram indicator, and receiving user input via a user interface control to selectively adjust the digital image based on the resolved features of the portion of the image data.

The foregoing and other implementations can each optionally include one or more of the following features, alone or in combination. In some implementations, the image data can be luminance, or one or more of R, G or B channels. A ratio of the specified quantity of the histogram bins to the predetermined quantity of histogram bins can be pre-specified. In addition, the operations can include adaptively specifying a ratio of the specified quantity of the histogram bins to the predetermined quantity of histogram bins based on an amount of detail in the image data having values larger than 1.0.

In some implementations, the operations can include assessing a small amount of detail in the portion of the image data that includes the image data values larger than 1.0. In this case, adaptively specifying the ratio of the specified quantity of the histogram bins to the predetermined quantity of histogram bins results in obtaining a first pre-specified ratio. In other implementations, the operations can include assessing a large amount of detail in the portion of the image data that includes the image data values larger than 1.0. In this case, adaptively specifying the specified ratio of the quantity of the histogram bins to the predetermined quantity of histogram bins results in obtaining a second pre-specified ratio. In some other implementations, the operations can include assessing the amount of detail in the portion of the image data that includes the image data values larger than 1.0 based on a relative quantity of the image data values larger than 1.0 with respect to the image data values in the total range of image data values. In some implementations, the operations include assessing the amount of detail in the portion of the image data that includes the image data values larger than 1.0 based on a distribution/spread and variability of the image data values larger than 1.0.

In some implementations, the operations can include determining that image data associated with another digital image only includes image data values in a range from 0.0 to 1.0, In response to the foregoing determination, the operations can include representing the image data associated with the other digital image in the histogram indicator over the entire predetermined quantity of the histogram bins.

According to another aspect, the described subject matter can also be implemented as a non-volatile computer storage medium encoded with a computer program, such that the program includes instructions that when executed by one or more computers cause the one or more computers to perform operations including determining that image data associated with a RAW digital image includes image data values in an extended range, e.g., (1.0, 2.0]. The operations further include representing, in response to the foregoing determination, a histogram of the image data associated with the RAW digital image over a predetermined quantity of histogram bins, where each of the histogram bins correspond to one or more image data values, such that a portion of the histogram of the image data associated with the RAW digital image corresponding to the extended range is represented over a specified quantity of the histogram bins that is greater than or equal to two adjacent histogram bins and less than half of the predetermined quantity of histogram bins. In addition, the operations include depicting resolved features of the histogram portion of the image data associated with the RAW digital image corresponding to the extended range that is represented over the specified quantity of bins.

The foregoing and other implementations can each optionally include one or more of the following features, alone or in combination. In some implementations, representing the histogram of the image data associated with the RAW digital image is such that another portion of the histogram of the image data of the RAW digital image that includes image data values in a non-extended range can be represented over the remaining histogram bins from the predetermined quantity of histogram bins. In some implementations, the operations include adaptively specifying a ratio of the specified quantity of the histogram bins to the predetermined quantity of histogram bins based on a characteristic of a portion of the image data associated with the RAW digital image that corresponds to the extended range.

Particular implementations of the subject matter described in this specification can be configured so as to realize one or more of the following potential advantages. For example, the described techniques may enable a user to view information corresponding to image data outside original bounds of a graphical representation (e.g. a histogram) of the image data without using additional screen real estate and/or without unnecessarily reducing the overall resolution at which the graphical representation of the image data is viewed. Further, the user can modify the resolution of a range of a scale of the graphical representation to better discriminate features of the image data represented over the range of interest. In this fashion, structure of a peak of the luminance histogram can be examined to determine whether image details may be recovered through an image exposure adjustment directed to the examined peak of the luminance histogram. For instance, when no structure can be distinguished for a one-bin representation of the histogram peak corresponding to the extended range data of a digital image, the disclosed technologies can enable the user of the image processing application to avoid guessing what the distribution of the extended range data is. For example, by expanding the range of the histogram corresponding to the extended range data in accordance with the techniques disclosed in this specification, the user may determine that the latter is distributed over most of the luminance values larger than 1.0, and therefore, there is a high likelihood that detail/viewable information in the image highlights can be recovered by adjusting exposure of the image. As another example, by expanding the range of the histogram corresponding to the extended range data according to the disclosed technologies, the user may determine that the extended range data happens to be bunched in a narrow peak (e.g. corresponding to the luminance level=2.0 of a RAW image), and hence, adjusting the image exposure would recover little or no detail in the image highlights. Accordingly, the user of the image processing application can use the disclosed systems and techniques to examine the peak structure of a luminance histogram, prior to initiating an exposure adjustment, so the user may determine upfront whether image details may be recovered via such exposure adjustment.

In addition to implementations that require user input, the disclosed technologies may be implemented to automatically detect whether a digital image has extended range data, and if so, to represent a histogram of the image data over at least two ranges of the histogram scale that have different resolutions, such that one of the two ranges corresponds to the detected extended range data. Additionally, when extended range image data is detected in the digital image, the two or more resolutions of respective ranges of the histogram scale can be determined programmatically, such that the extended range data uses as few of the total number of bins of a histogram indicator as possible and/or necessary.

Details of one or more implementations of the disclosed subject matter are set forth in the accompanying drawings and the description below. Other features, aspects, and potential advantages will become apparent from the description, the drawings, and the claims.

BRIEF DESCRIPTION OF THE DRAWINGS

Like reference numbers and designations in the various drawings indicate like elements.

DETAILED DESCRIPTION

FIGS. 2A-2H show aspects of a graphical user interface (GUI) 200 that provides an indicator 220 used to represent a graphical representation of image data associated with an image 205 over two ranges of a scale corresponding to two resolutions. The graphical representation can be a histogram of the image data. The GUI 200 can be implemented as part of an image processing application executed by a computer system. In addition, the GUI 200 can also include a control 210 that enables a user of the image processing application to adjust the displayed image 205 based on information shown by the histogram indicator 220. The exposure value 215 depicted in FIGS. 2A-2H corresponds to the unadjusted image 205.

Figure 1A:
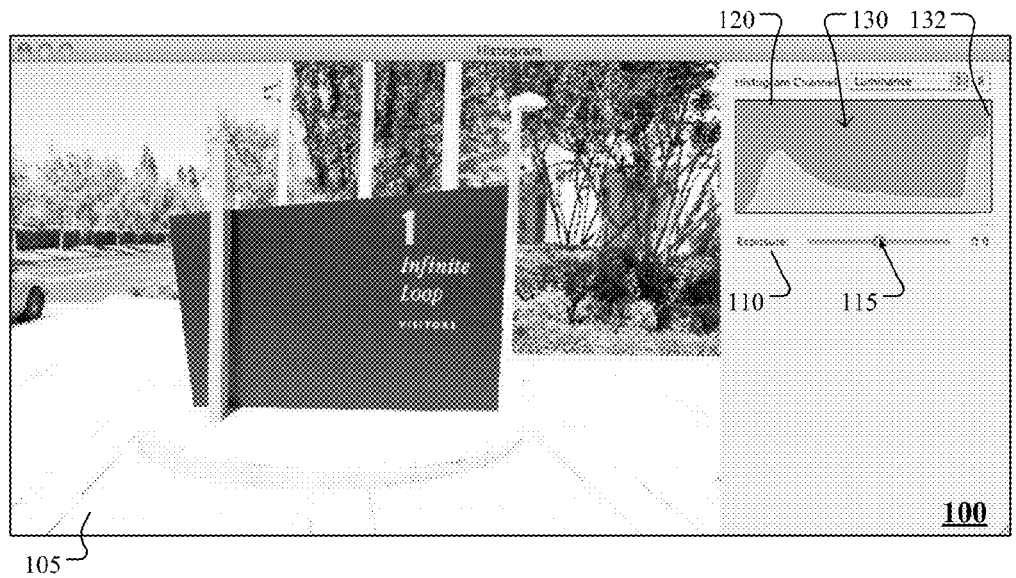
FIGS. 1A-1B show aspects of a graphical user interface that provides an indicator used to represent a graphical representation of image data associated with a digital image using a single resolution over the entire range of the scale.
Figure 1B:
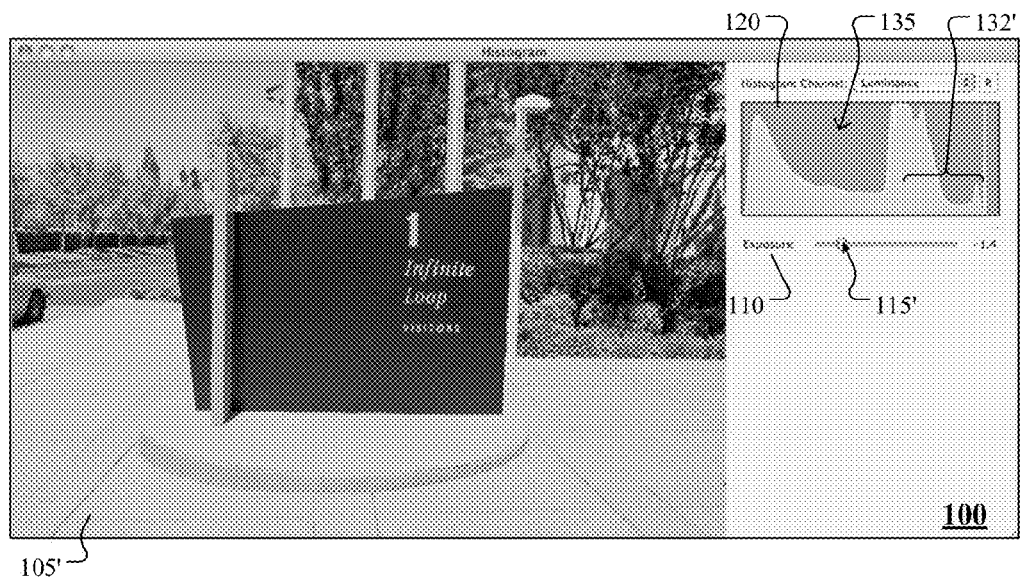
Figure 2A:
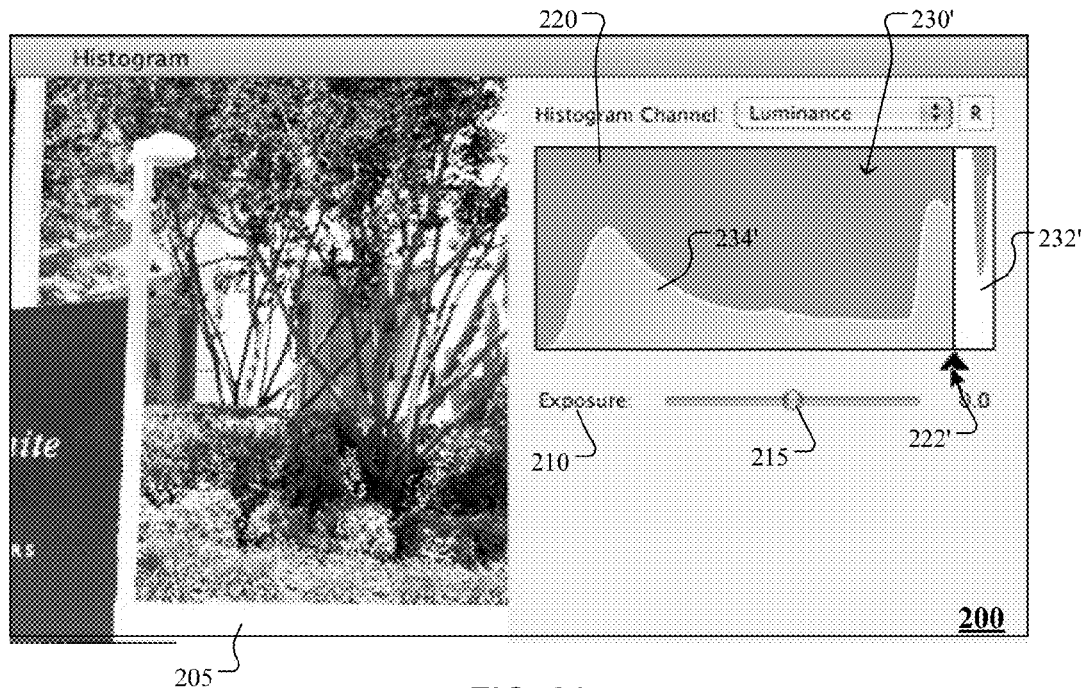
FIGS. 2A-2H show aspects of a graphical user interface that provides an indicator used to represent a graphical representation of image data associated with a digital image over two ranges of a scale corresponding to two resolutions.

In FIG. 2A, a representation of a histogram of the luminance 230' associated with the unadjusted image 205 is displayed in the histogram indicator 220 of the GUI 200. The representation of the luminance histogram 230' includes a view of the extended range data 232' corresponding to pixels of the unadjusted image 205 having luminance levels larger than or equal to 1.0 that are represented on a scale corresponding to k' histogram bins from the total of N histogram bins of the histogram indicator 220, where k' is larger than or equal to two adjacent histogram bins, k'≥2 (N=256 for an 8-bit digital image, or N=65,536 for a 16-bit digital image.) Moreover, the representation of the luminance histogram 230' also includes a view of the non-extended range data 234' corresponding to pixels of the unadjusted image 205 having luminance levels less than 1.0 that are represented on a scale corresponding to N−k' histogram bins. When k'<<N, e.g., when k'≥0.1 N, the (N−k')-scale used to represent luminance associated with the non-extended luminance data 234' may be considered a quasi-linear scale. Additionally, note that the histogram indicator 220 is not extended to account for the additional level of detail in the representation of the extended range data 232', and thus no additional real estate of the GUI 200 is required to implement the histogram indicator 220, compared to, for example, the indicator 120 described above in connection with FIGS. 1A-1B.

In some implementations, the quantity of k' bins used to represent the histogram portion 232' corresponding to the extended range data can be specified via input from a user associated with the image processing application. In this case, the GUI 200 can receive user input requesting to place a histogram range separator (e.g., a vertical cursor) at a specified location 222' on the horizontal axis of the luminance histogram 230' for specifying the number of bins used to represent the image pixels having luminance in the range of 1.0-2.0. Although represented over only about 10% of the bins of the histogram indicator 220, the view of the luminance histogram associated with the extended range data 232' exposes luminance levels distributed over the entire extended range 1.0-2.0. The structural richness of the luminance histogram associated with the extended range data 232' foreshadows that significant details may be recovered in the highlights of the unadjusted image 205 if an exposure adjustment were to be performed.

Figure 2B:
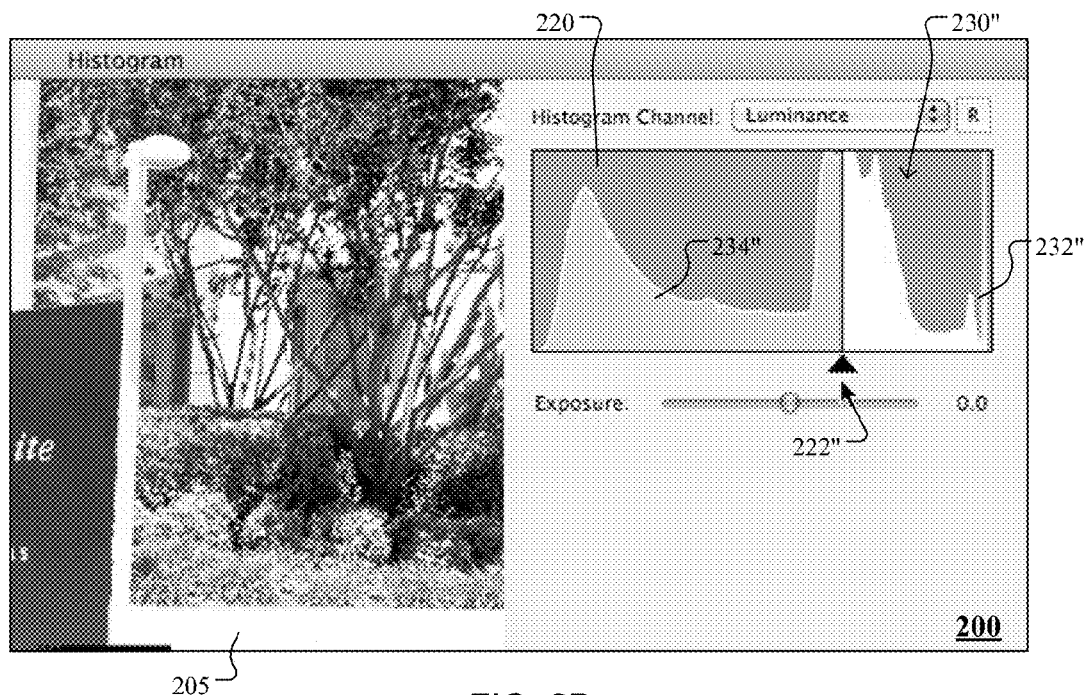

However, even finer structure of the luminance histogram portion 232' associated with the extended range data may be visualized if the latter were represented over a larger quantity of bins k">k', for example, k"≈N/3, where N is the total number N of histogram bins of the histogram indicator 220. To this effect, FIG. 2B shows that the histogram indicator 220 of the GUI 200 displays another representation of the luminance histogram 230" of the unadjusted image 205 when the user places the histogram range separator at another location 222". In this case, a representation of the extended range data 232" corresponding to pixels of the unadjusted image 205 having luminance levels larger than or equal to 1.0 is displayed on a scale corresponding to k" (about 33%) of the total histogram bins, while a representation of the non-extended range data 234" corresponding to pixels of the unadjusted image 205 having luminance levels less than 1.0 is displayed on a scale corresponding to N−k" (about 66%) of the total histogram bins. The representation of the luminance histogram portion associated with the extended range data 232" confirms the presence of luminance levels over the entire extended range 1.0-2.0. As discussed above in this specification, an unadjusted image 205 having a rich structure in the extended range data 232" of the luminance histogram 230" is a good candidate for an exposure adjustment to recover details in the highlights of the image 205.

In some implementations, the quantity of "k" bins used to represent the histogram portion corresponding to the extended range data can be specified programmatically. For example, the image processing application with which the GUI 200 is associated can detect whether or not an image 205 has extended range data, corresponding to image data values >1.0. RAW images are examples of digital images that have extended range data. JPEG images are examples of digital images that have no extended range data. Other examples of images with no extended range data are digital images that have been adjusted or that simply have no data >1.0. If the image processing application detects that the image 205 has no extended range data, then the luminance histogram can be automatically displayed in the histogram indicator 220 over one single-resolution scale corresponding to the non-extended range of 0.0-1.0. In this case, the histogram indicator 220 would be equivalent to the indicator 120 described above in connection with FIGS. 1A-1B.

If, however, the image processing application detects that the image 205 has extended range data, the luminance histogram can be automatically displayed in the histogram indicator 220 over two scales corresponding to the non-extended range of 0.0-1.0 and to the extended range of 1.0-2.0, respectively, such that a ratio of a quantity of "k" histogram bins associated with the extended range data to a quantity "N−k" of histogram bins associated with the non-extended range data is a predetermined ratio. N is the total quantity of bins of the histogram indicator 220. For example, the histogram indicator 220 can be automatically displayed based on a 25%/75% ratio of the scales, where 25% of the histogram bins are allocated to the extended range data. Other examples of predetermined ratio values are 10%/90%, 5%/95%, etc.

In other implementations, subsequent to detecting that the image 205 has extended range data, the image processing application can analyze the detected extended range data to assess an amount of detail therein. Based on the assessed amount of detail in the detected extended range data, the image processing application can adaptively determine a relative ratio for the two scales of the histogram indicator 220 corresponding to the non-extended range 0.0-1.0 and to the extended range 1.0-2.0.

The amount of detail in the extended range data of an image can be assessed in terms of likelihood that an exposure adjustment applied to the image recovers significant details in the highlights of the image. As described above in connection with FIGS. 1A-1B, aspects that correlate to high likelihood of recovering significant details in the highlights of an image via an exposure adjustment are (i) that the extended range data exceeds a particular fraction of the total data of the image and (ii) that the extended range data is distributed/spread over most of the extended range 1.0-2.0.

As such, a criterion that can be used to assess the amount of detail in the detected extended range data is based on how the relative size of the extended range data to the total image data (non-extended range data plus extended range data) compares to a predetermined relative size. The predetermined relative size of the extended range data can be 10%, 5%, 2%, 1%, etc. For example, the image 205 is said to have a large amount of detail in the extended range data if the relative size of the extended range data to the total data of the image is more than the predetermined relative size. As another example, the image 205 is said to have a small amount of detail in the extended range data if the relative size of the extended range data to the total data of the image is less than or equal to the predetermined relative size.

Another criterion that can be used to assess the amount of detail in the detected extended range data is based on how a fraction occupied by the extended range data within the extended range 1.0-2.0 compares to a predetermined fraction. The predetermined fraction of the extended range 1.0-2.0 occupied by the extended range data can be 100%, 90%, 75%, 50%, etc. For example, the image 205 is said to have a large amount of detail in the extended range data if the fraction of the extended range 1.0-2.0 occupied by the extended range data is more than the predetermined fraction. As another example, the image 205 is said to have a small amount of detail in the extended range data if the fraction of the extended range 1.0-2.0 occupied by the extended range data is less than or equal to the predetermined fraction.

The criteria described above can be used in combination to assess the amount of detail in the detected extended range data. For example, the image 205 is said to have a large amount of detail in the extended range data if a relative size of the extended range data to the total data of the image is more than the predetermined relative size and if the fraction of the extended range 1.0-2.0 occupied by the extended range data is more than the predetermined fraction. As another example, the image 205 is said to have a small amount of detail in the extended range data if a relative size of the extended range data to the total data of the image is less than or equal to the predetermined relative size and if the fraction of the extended range 1.0-2.0 occupied by the extended range data is less than or equal to the predetermined fraction. Other levels of the amount of detail in the extended range data can be obtained based on the combination of the above criteria. For example, the image 205 is said to have an intermediate amount of detail in the extended range data if a relative size of the extended range data to the total data of the image is more than the predetermined relative size and if the fraction of the extended range 1.0-2.0 occupied by the extended range data is less than or equal to the predetermined fraction. And so on.

Moreover, a ratio of a quantity of "k" histogram bins associated with the extended range data to a quantity "N–k" of histogram bins associated with the non-extended range data can be adaptively determined based on the amount of detail in the extended range data described above so that the extended range data uses as few of the N bins of the histogram indicator 220 as possible and/or necessary. For example, if the image has a large amount of detail in the extended range data, then the histogram indicator 220 can be automatically displayed based on a 25%/75% ratio of the scales, where 25% of the histogram bins are allocated to the extended range data. Other adaptively determined scale ratios when the image has a large amount of detail in the extended range data can be 33%/66%, 40%/60%, and the like. As another example, if the image has a small amount of detail in the extended range data then the histogram indicator 220 can be automatically displayed based on a 5%/95% ratio of the scales, where 5% of the histogram bins are allocated to the extended range data. Other adaptively determined scale ratios when the image has a small amount of detail in the extended range data can be 1%/99%, 0.1%/99.9%, and the like.

In the implementations described above when the quantity of "k" bins used to represent the histogram portion corresponding to the extended range data is specified programmatically, the histogram range separator (e.g., the vertical cursor positioned at locations 222', 222" in FIGS. 2A, 2B) may be displayed in the histogram indicator 220, but user interface elements that let the user decide where to place the histogram range separator can be suppressed. This modification corresponds to operating the histogram indicator 220 in automatic mode that does not require user input regarding the relative extent of the horizontal scale corresponding to the extended range data.

Figure 2C:
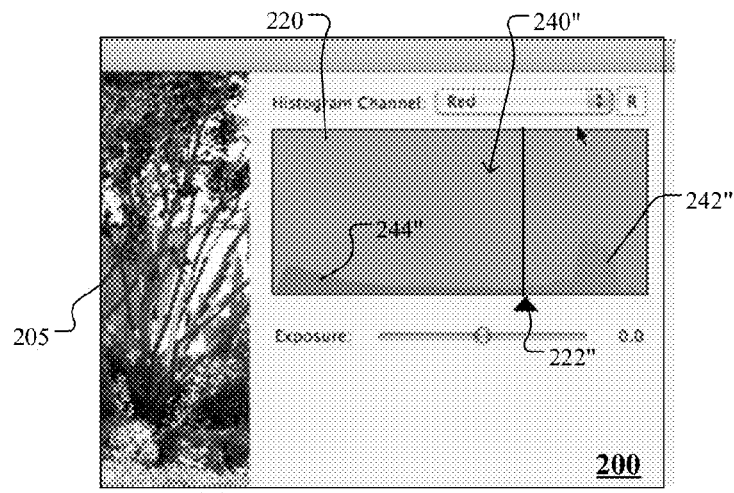
Figure 2D:
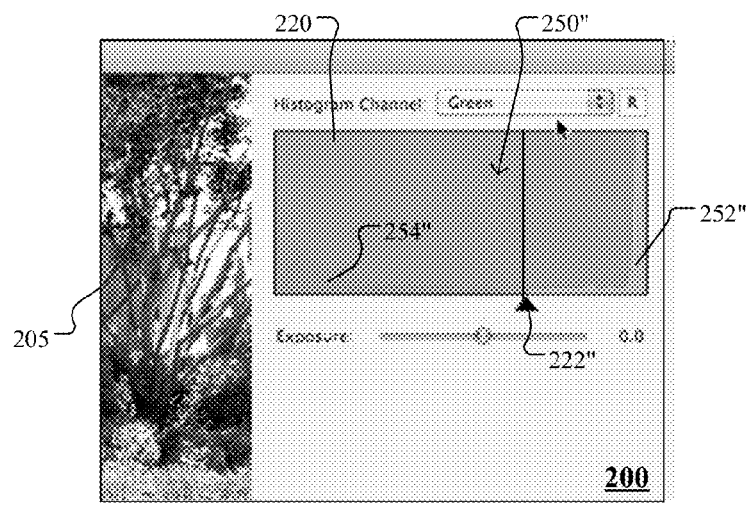
Figure 2E:
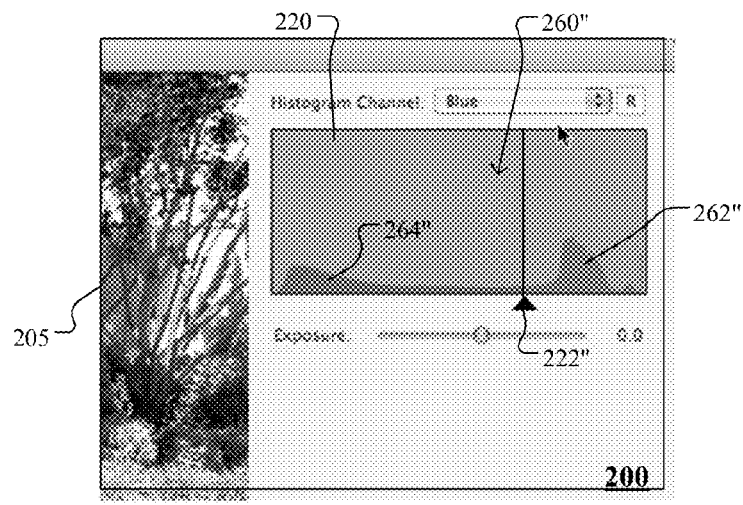

FIGS. 2C, 2D and 2E show the histogram indicator 220 of the GUI 200 having the histogram range separator positioned at location 222", in accordance with FIG. 2B, and displaying representations of the red (R) channel histogram 240", the green (G) channel histogram 250", and the blue (B) channel histogram 260", respectively, of the unadjusted image 205. In FIG. 2C, a representation of the extended range R-data 242" corresponding to pixels of the unadjusted image 205 having R-levels larger than or equal to 1.0 is displayed on a scale corresponding to the extended range 1.0-2.0, while a representation of the non-extended range R-data 244" corresponding to pixels of the unadjusted image 205 having R-levels less than 1.0 is displayed on a scale corresponding to the non-extended range 0.0-1.0. The representation of the R-histogram portion associated with the extended range R-data 242" reveals the presence of numerous R-levels (or equivalently of a finite R-data distribution) over most of the extended range 1.0-2.0. Typically, an unadjusted image 205 having a rich distribution structure in the extended range R-data 242" of the R-histogram 240" is a good candidate for a red-color adjustment to recover red-details in the highlights of the image 205.

In FIG. 2D, a representation of the extended range G-data 252" corresponding to pixels of the unadjusted image 205 having G-levels larger than or equal to 1.0 is displayed on a scale corresponding to the extended range 1.0-2.0, while a representation of the non-extended range G-data 254" corresponding to pixels of the unadjusted image 205 having G-levels less than 1.0 is displayed on a scale corresponding to the non-extended range 0.0-1.0. The representation of the G-histogram portion associated with the extended range G-data 252" reveals the presence of a sharp G-peak corresponding to the last histogram bin of the extended range 1.0-2.0, and very few G-levels over the extended range 1.0-2.0. Generally, an unadjusted image 205 having a sparse distribution structure in the extended range G-data 252" of the G-histogram 250" is a poor candidate for a green-color adjustment to recover green-details in the highlights of the image 205.

In FIG. 2E, a representation of the extended range B-data 262" corresponding to pixels of the unadjusted image 205 having B-levels larger than or equal to 1.0 is displayed on a scale corresponding to the extended range 1.0-2.0, while a representation of the non-extended range B-data 264" corresponding to pixels of the unadjusted image 205 having B-levels less than 1.0 is displayed on a scale corresponding to the non-extended range 0.0-1.0. The representation of the B-histogram portion associated with the extended range B-data 262" reveals the presence of numerous B-levels (or equivalently of a finite B-data distribution) over most of the extended range 1.0-2.0. In general, an unadjusted image 205 having a rich structure in the extended range B-data 262" of the B-histogram 240" is a good candidate for a blue-color adjustment to recover blue-details in the highlights of the image 205.

Figure 2F:
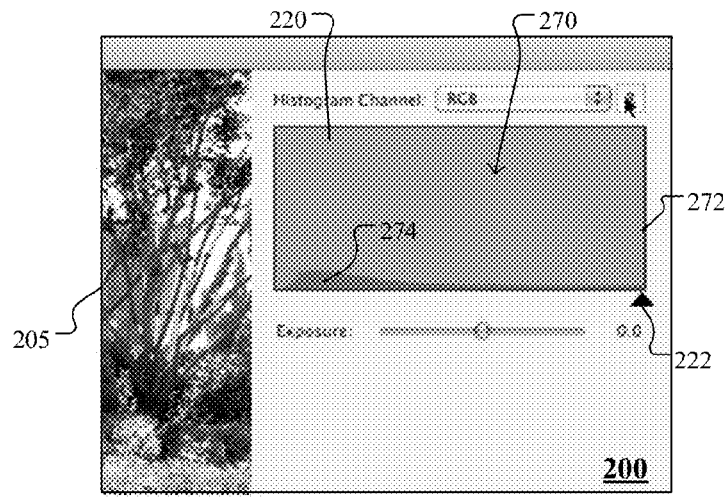
Figure 2G:
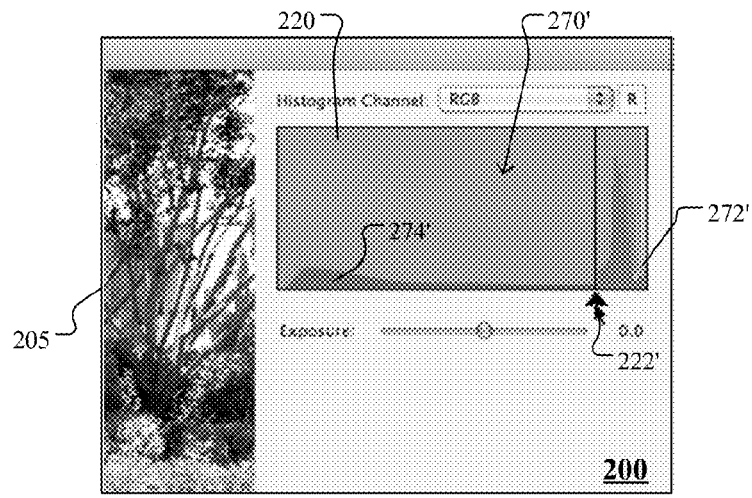
Figure 2H:
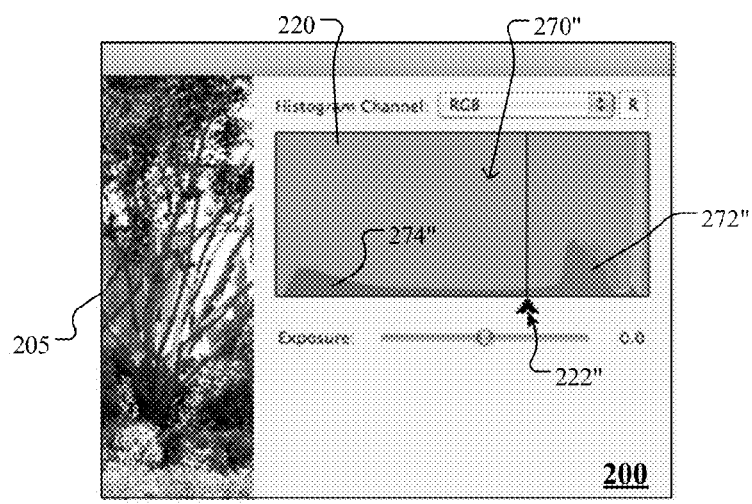

FIGS. 2F, 2G and 2H show the histogram indicator 220 of the GUI 200 displaying representations of a combined RGB histogram 270, 270' and 270", respectively, of the unadjusted image 205, corresponding to respective locations 222, 222' and 222" of the histogram range separator. In FIG. 2F, a representation of the extended range RGB-data 272 corresponding to pixels of the unadjusted image 205 having RGB-levels larger than or equal to 1.0 is displayed as a "structureless" RGB peak within the $N^{th}$ bin (or the rightmost bin corresponding to levels larger than or equal to 1.0, while a representation of the non-extended range R-data 274 corresponding to pixels of the unadjusted image 205 having RGB-levels less than 1.0 is displayed on a linear scale corresponding to the other N−1 bins of the histogram indicator 220. As described above, N=256 for an 8-bit digital image, and N=65,536 for a 16-bit digital image. As clearly illustrated in FIG. 2F, no RGB distribution structure can be discriminated within the one-bin RGB peak corresponding to the extended range RGB-data.

The GUI 200 can receive user inputs to place the vertical cursor to locations 222' and 222" on the horizontal axis of the combined RGB histogram, as shown in FIGS. 2G and 2H, specifying the number of bins used to represent the image pixels having RGB levels in the range of 1.0-2.0. In FIG. 2G, a representation of the extended range RGB-data 272' corresponding to pixels of the unadjusted image 205 having RGB-levels larger than or equal to 1.0 is displayed on a scale corresponding to k' (about 10%) of the total histogram bins, while a representation of the non-extended range data 274' corresponding to pixels of the unadjusted image 205 having luminance levels less than 1.0 is displayed on a scale corresponding to N−k' (about 90%) of the total histogram bins. N represents the total number of bins of the histogram indicator 220. In FIG. 2H, a representation of the extended range data 272" corresponding to pixels of the unadjusted image 205 having RGB-levels larger than or equal to 1.0 is displayed on a scale corresponding to k" (about 33%) of the total histogram bins, while a representation of the non-extended range RGB-data 274" corresponding to pixels of the unadjusted image 205 having RGB-levels less than 1.0 is displayed on a scale corresponding to N−k" (about 66%) of the total histogram bins. Note that as the number of bins, k">k'>2, of the scale associated with the extended range RGB-data increases (going from FIG. 2F to FIG. 2G to FIG. 2H) the distribution structure of the RGB peak of the extended range data can be better discriminated.

FIGS. 3A-3D show aspects of a graphical user interface (GUI) 300 that provides an indicator 320 used to represent a graphical representation of image data associated with an image 305 over multiple ranges of a scale corresponding to multiple resolutions. The graphical representation can be a histogram of the image data. The GUI 300 can be implemented as part of an image processing application executed by a computer system. In addition, the GUI 300 can also include a control 310 that enables a user of the image processing application to adjust the displayed image 305 based on information shown by the histogram indicator 320. The exposure value 315 depicted in FIGS. 3A-3D corresponds to the unadjusted image 305.

In this implementation, the horizontal scale of the histogram indicator 320 can be modified on each of four luminance bands, namely, the extended range data band 332 corresponding to luminance levels in the range 1.0-2.0, the bright tones band 334, the medium tones band 336 and the dark tones bands 338.

Figure 3A:
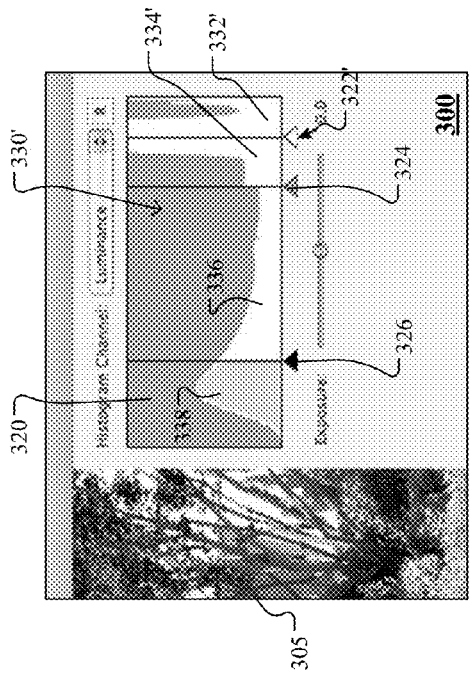
FIGS. 3A-3D show aspects of a graphical user interface that provides an indicator used to represent a graphical representation of image data associated with a digital image over multiple ranges of a scale corresponding to multiple resolutions.

In FIG. 3A, a representation of a histogram of the luminance 330 associated with the unadjusted image 305 is displayed in the histogram indicator 320 of the GUI 300. The extents of the unmodified bands in FIG. 3A are 1-bin for the extended range data band 332, $k_1$-bins for the bright tones band 334, $k_2$-bins for the medium tones band 336, and $k_3$-bins for the dark tones band 338, such that the total number of bins of the histogram indicator 320 is $N=1+k_1+k_2+k_3$. The band-ranges identified above can be delimited by histogram range separators (e.g., vertical cursors) positioned at locations 322, 324 and 326 of the horizontal scale of the histogram indicator 320. In some implementations, the locations of the histogram range separators, and therefore the relative distribution of bins for the aforementioned tone bands, can be changed in response to one or more user specifications. In other implementations, the locations of the histogram range separators and the underlying scales corresponding to these tone bands can be specified programmatically.

Figure 3C:
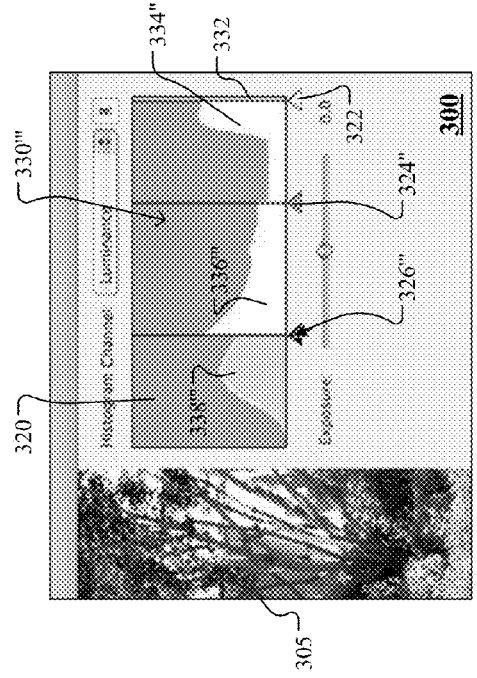
Figure 3B:
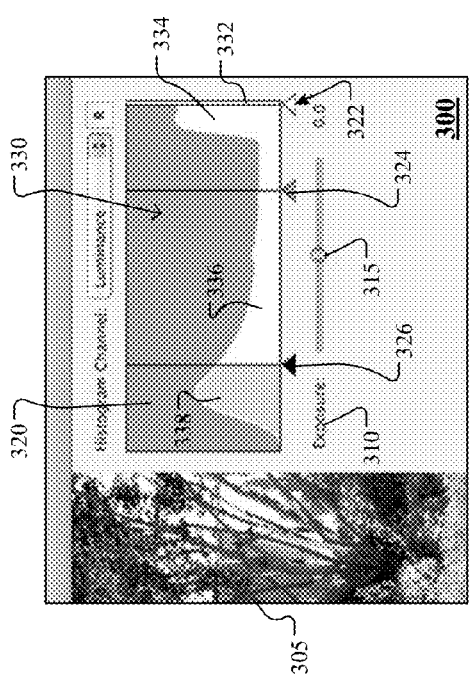

FIG. 3B shows that a histogram range separator can be repositioned from location 322 to location 322', e.g., as specified by a user. In response to receiving this user specification, the image processing application allocates k bins to another representation of the extended range data band 332' (such that k≥2) and leaves the representations of the medium tones band 336 and the dark tones band 338 unchanged. Consequently, the representation of the luminance histogram 330' can be distributed in the following manner: k-bins are used to represent the extended range data band 332', $(k_1+1-k)$-bins are used to represent the bright tones band 334', $k_2$-bins are used to represent the medium tones band 336, and $k_3$-bins are used to represent the dark tones band 338.

Figure 3D:
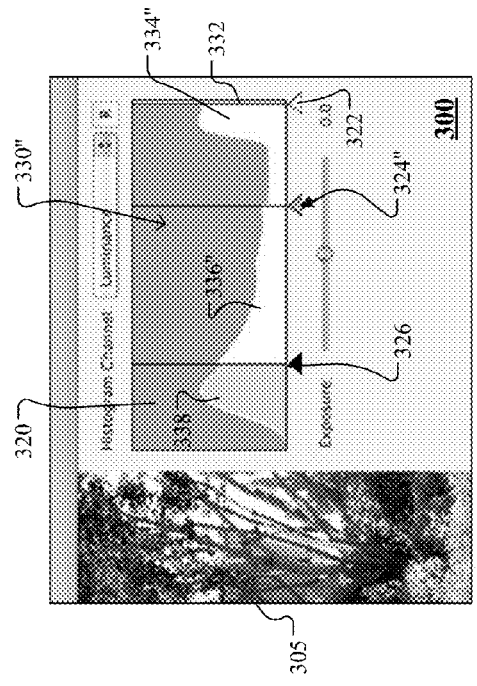

FIG. 3C shows that a histogram range separator can be repositioned from location 324 to location 324", e.g., as specified by a user. In response to receiving this user specification, the image processing application allocates $k_1"$ bins to the bright tones band 334" (such that $k_1">k_1$) and leaves the extended range data band 332 and the dark tones band 338 unchanged. As such, the representation of the luminance histogram 330" can be distributed in the following manner: 1-bin is used to represent the extended range data band 332, $k_1"$-bins are used to represent the bright tones band 334", $(k_2+k_1-k_1")$-bins are used to represent the medium tones band 336", and $k_3$-bins are used to represent the dark tones band 338. FIG. 3D shows that a histogram range separator can be repositioned from location 326 to location 326''', e.g., as specified by a user. In response to receiving this user specification, the image processing application allocates $k_3'''$ bins to the dark tones band 338''' (such that $k_3'''>k_3$) and leaves the extended range data band 332 and the previously changed bright tones band 334" unchanged. Hence, the representation of the luminance histogram 330''' can be distributed in the following manner: 1-bin is used to represent the extended range data band 332, $k_1"$-bins are used to represent the bright tones band 334", $(k_2"+k_3-k_3")$-bins are used to represent the medium tones band 336''', and $k_3'''$-bins are used to represent the dark tones band 338'''.

A band-range from among the four bands of the luminance histogram identified above can be extended, as described above in connection with FIGS. 3B-3D, to discriminate and/or identify peak "structure". For example, by extending the extended range from 1-histogram bin to k'>2 histogram bins, as shown in FIG. 3B, the structure of the extended range data peak 332' can be visualized and/or resolved.

The image processing application can be configured to determine, for each of the above-identified tone bands, whether or not the image 305 has luminance levels corresponding to the tone band. In case no data is found for a given tone band of the image 305, the range of the horizontal scale of the histogram indicator 320 corresponding to the given band can be removed. For example, if it is determined that the image 305 has no luminance levels >1.0, than the histogram indicator 320 can be presented in the GUI 300 to have three ranges (instead of four) corresponding to the bright tones band, the medium tone bands and the dark tone band. In case data is found for all four tone bands, the relative number of bins on the horizontal scale of the histogram indicator 320 can be specified programmatically. In some implementations, the relative extent of the scales (in terms of the number of bins/scale) corresponding to the extended range data, bright, medium and dark tone bands can be predetermined, e.g., 25/25/25/25%, 10/30/30/30%, or 1/33/33/33%, etc. In other implementations, the relative extent of the scales (in terms of the number of bins/scale) corresponding to the extended range data, bright, medium and dark tone bands can be adaptively determined based on, e.g., respective amounts of detail in the luminance data corresponding to the four tone bands. An amount of detail in a particular tone band can be assessed in accordance with rules and criteria described above in connection with FIGS. 2A-2B. Examples of adaptive determinations of the relative scales are 10/30/30/30%, when the luminance data has large amounts of detail in all four tone bands; or 1/33/33/33%, when the luminance data has a small amount of detail in the extended range, and large amounts of detail in the other three tone bands.

Figure 4:
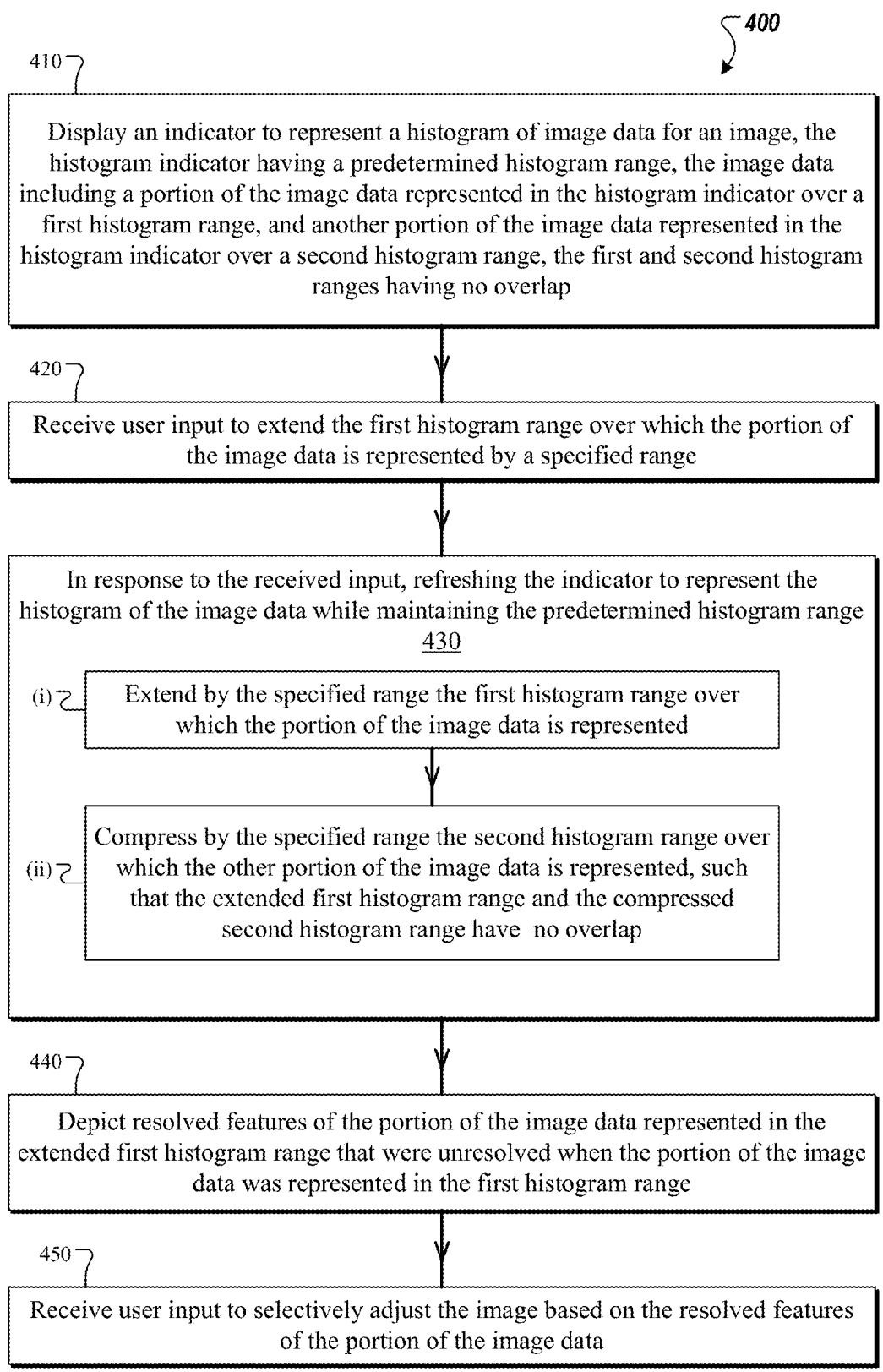
FIG. 4 shows an example of a method for representing a graphical representation of image data associated with a digital image over multiple ranges of a scale corresponding to multiple resolutions.

FIG. 4 shows an example of a method 400 for representing a graphical representation of image data associated with a digital image over multiple ranges of a scale corresponding to multiple resolutions. The graphical representation can be a histogram of the image data. In some implementations, the method 400 can be executed by one or more computers, for example as part of an image processing application which has GUI 200 (or 300).

At 410, an indicator representing a histogram of image data for a digital image is displayed, e.g., in a GUI 200 (or 300) of an image processing application. The histogram indicator has a predetermined histogram range, e.g., N histogram bins corresponding to 256 grey-levels associated with 8-bit image data encoding, or to 65,536 grey-levels associated with 16-bit image data encoding. A portion of the image data is represented in the histogram indicator over a first histogram range, and another portion of the image data is represented in the histogram indicator over a second histogram range. In some implementations, the first and second histogram ranges are mutually exclusive, or equivalently, have no overlap. For example, the portion of the image data can be the extended range data of the digital image (having image data values >1.0). For a RAW image, the extended data can be in the range 1.0-2.0. Further, the first histogram range can be one bin at the upper end of the predetermined histogram range. In this case, the entire extended range data of the digital image is represented in the one-bin peak of the rightmost histogram bin (e.g., the 256$^{th}$ histogram bin for an 8-bit image or the 65,536$^{th}$ histogram bin for a 16-bit image). In some implementations, the image data is luminance associated with the digital image, as described above in connection with FIGS. 2A-2B and FIGS. 3A-3D. In other implementations, the image data is any one of R, G or B channels associated with the digital image, as described above in connection with FIGS. 2C-2E. In some other implementations, the image data is a combination of R, G and B channels associated with the digital image, as described above in connection with FIGS. 2F-2H.

At 420, user input is received requesting to extend the first histogram range over which the portion of the image data is represented by a specified range. In the example implementation described above in connection with FIGS. 2A-2H, the user input can be received through the histogram range separator (vertical cursor) of the histogram indicator 220. In the example implementation described above in connection with FIGS. 3A-3D, the user input can be received through any of the three histogram range separators (vertical cursors) of the histogram indicator 320.

At 430, in response to the received input, the histogram indicator is refreshed while maintaining the predetermined histogram range, such that the first histogram range visually expands, and the second histogram range visually compresses. As part of refreshing the histogram indicator, (i) the first histogram range used to represent the portion of the image data is extended by the specified range. Also as part of refreshing the histogram indicator, (ii) the second histogram range used to represent the other portion of the image data is compressed by the specified range. In some implementations, the extended first histogram range and the compressed second histogram range have no overlap. For example, the first histogram range and the second histogram range can be adjacent. Further in this example, the two ranges can occupy the entire predetermined histogram range, such that the sum of the first histogram range and the second histogram range equals the predetermined histogram range.

At 440, resolved features of the portion of the image data represented in the extended first histogram range, which were unresolved when the portion of the image data was represented in the first histogram, range are depicted in the histogram indicator. As discussed above in this specification, an image having a rich distribution structure corresponding to a portion of image data is a good candidate for an exposure adjustment to recover details in regions of the image that correspond to the portion of the image data. Consequently, at 450, user input is received to selectively adjust the digital image based on the resolved features of the portion of the image data.

The method 400 described above in connection with FIG. 4 can be implemented in an interactive mode of an image processing application with which the GUIs 200 or 300 are associated, such that the user can specify, for example, a distribution of the two or more scales that are used to represent the histogram of the image data over the predetermined histogram range. However, the techniques described in this specification can also be implemented in an automated mode of the image processing application with which the GUIs 200 or 300 are associated, such that the application can adaptively specify a distribution of the two or more scales that are used to represent the histogram of the image data over the predetermined histogram range, as described below in connection with FIG. 5.

Figure 5:
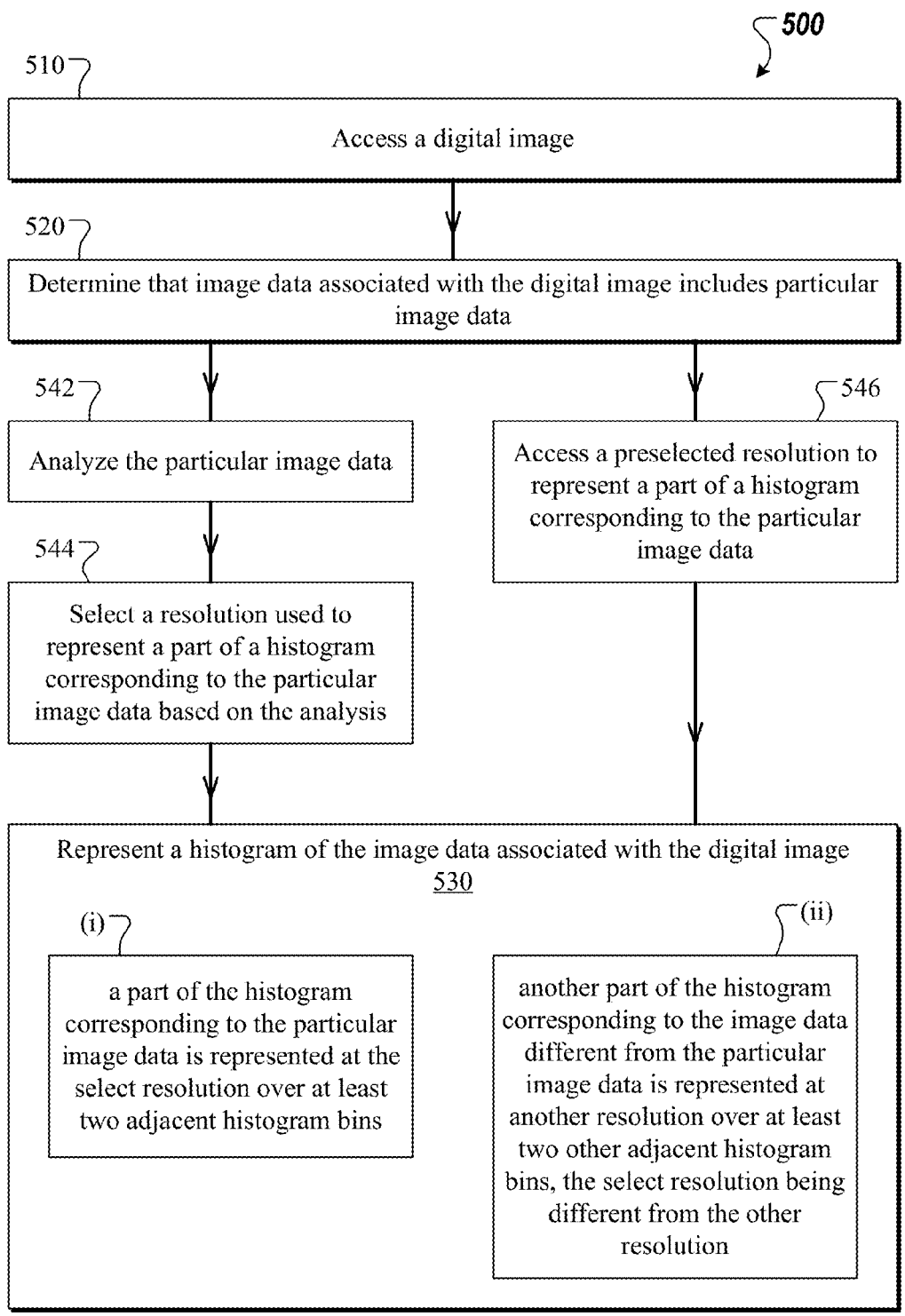
FIG. 5 shows another example of a method for representing a graphical representation of image data associated with a digital image over multiple ranges of a scale corresponding to multiple resolutions.

FIG. 5 shows another example of a method 500 for representing a histogram of a digital image over multiple ranges of a scale corresponding to multiple resolutions. In some implementations, the method 500 can be executed by one or more computers, for example as part of an image processing application which has GUI 200 (or 300). For instance, the method 500 can be applied in connection to a digital image displayed in GUI 200 (or 300) for adaptively representing, in the histogram indicator 220 (or 320), image data associated with the displayed digital image. In some implementations, the methods 400 and 500 can be executed sequentially or in combination.

At 510, a digital image is accessed. In some implementations, a data processing application can access a digital image that is stored in a data repository hosted by one or more storage devices and can retrieve image data associated with the accessed image. For example, the digital image can have image values in an extended range 1.0–x and in a non-extended range 0.0-1.0. The extended range has 1.0 for a lower bound and the real number x for an upper bound, where x=2.0, 3.0, 4.0, etc. for RAW digital images.

At 520, the application determines that image data associated with the digital image includes particular image data (that is predefined as described below.) In some implementations, the image data can be luminance associated with the digital image. Further, the particular image data can be defined to be the luminance of the digital image that has values in an extended range that includes image data values >1.0. In other implementations, the image data can be one or more of the red (R), green (G), and blue (B) channels associated with the digital image.

In response to the determination that the image data includes the particular image data, at 530, a histogram of the image data associated with the digital image is represented, such that (i) a part of the histogram corresponding to the particular image data is represented at a specified resolution over at least two adjacent histogram bins, and (ii) another part of the histogram corresponding to the image data different from the particular image data is represented at another resolution over at least two other adjacent histogram bins. The resolution is specified to be different from the other resolution, as described below at 532 and 534.

In case the image data is the luminance of the digital image, the particular image data corresponds to the luminance over the extended range (1.0, x], and the image data different from the particular image data corresponds to the luminance having values over a non-extended range [0, 1.0]. For a RAW image, x can be =2.0, 3.0, etc. For example, the histogram of the image data associated with the digital image can be represented in a digital indicator 220 (or 320) that has a predetermined quantity of histogram bins "N". As such, a portion of the image data associated with the digital image that includes image data values in the extended range (1.0, x] can be represented over a specified quantity of the histogram bins "k" that is greater than or equal to two adjacent histogram bins (k≥2) and less than a quantity of histogram bins "K" corresponding to a fraction of the predetermined quantity of histogram bins "N" equal to a ratio of the extended range to a total range of image data values, k<K=N*(x−1.0)/(x−0). In case the digital image is a RAW image for which x=2.0, a portion of the image data associated with the RAW image that includes image data values in the extended range (1.0, 2.0] can be represented over a specified quantity of the histogram bins "k" that is greater than or equal to two adjacent histogram bins (k≥2) and less than half of the predetermined quantity of histogram bins N/2. Concurrently to displaying the extended range portion of the image data associated with the digital image over the specified quantity of histogram bins, another portion of the image data associated with the digital image that includes image data values in a non-extended range [0.0, 1.0] is represented over the remaining histogram bins from the predetermined quantity of histogram bins. The quantity of histogram bins can be specified as described below at 532 and 534.

In some implementations, at 532, the particular image data can be analyzed. The analysis can be performed to assess an amount of detail in the portion of the image data that includes the image data values in the extended range (1.0, x]. For example, the amount of detail in the extended range data can be assessed based on a relative quantity of the image data values in the range from 1.0 to x with respect to the image data values in the full range from 0.0 to x. As another example, the amount of detail in the extended range data can be assessed based on a distribution of the image data values in the range from 1.0 to x. For a RAW image, x can be =2.0, 3.0, 4.0, etc. These and other ways to assess the amount of detail in the extended range data are described in detail above in connection with FIGS. 2A-2B.

At 534, a resolution used to represent the part of the histogram corresponding to the particular image data is specified based on the analysis performed at 532. For example, the amount of detail in the extended range data can be found to be small. In this case, a first pre-specified ratio of the specified quantity of the histogram bins to the predetermined quantity of histogram bins can be specified. As another example, the amount of detail in the extended range data can be found to be large. In this case, a second pre-specified ratio of the specified quantity of the histogram bins to the predetermined quantity of histogram bins can be specified. These and other examples of specifying the ratio of the specified quantity of the histogram bins to the predetermined quantity of histogram bins based on the amount of detail in the extended range data are described in detail above in connection with FIGS. 2A-2B.

In other implementations, at 536, a pre-specified resolution used to represent the part of the histogram corresponding to the particular image data can be accessed. For example, a ratio of the specified quantity of the histogram bins to the predetermined quantity of histogram bins can be pre-specified as described in detail above in connection with FIGS. 2A-2B.

Moreover, the application can determine that image data associated with another digital image only includes luminance values in the non-extended range 0.0-1.0. In response to such determination, the histogram of the luminance associated with the other digital image is represented at a resolution that is between the specified resolution and the other resolution used above for the case when the digital image has luminance data over both non-extended and extended ranges. For example, the image data associated with the other digital image, which only includes non-extended data, can be represented in the histogram indicator 220 (or 320) of the GUI 200 (or 300) over the entire predetermined quantity of the histogram bins.

Figure 6:
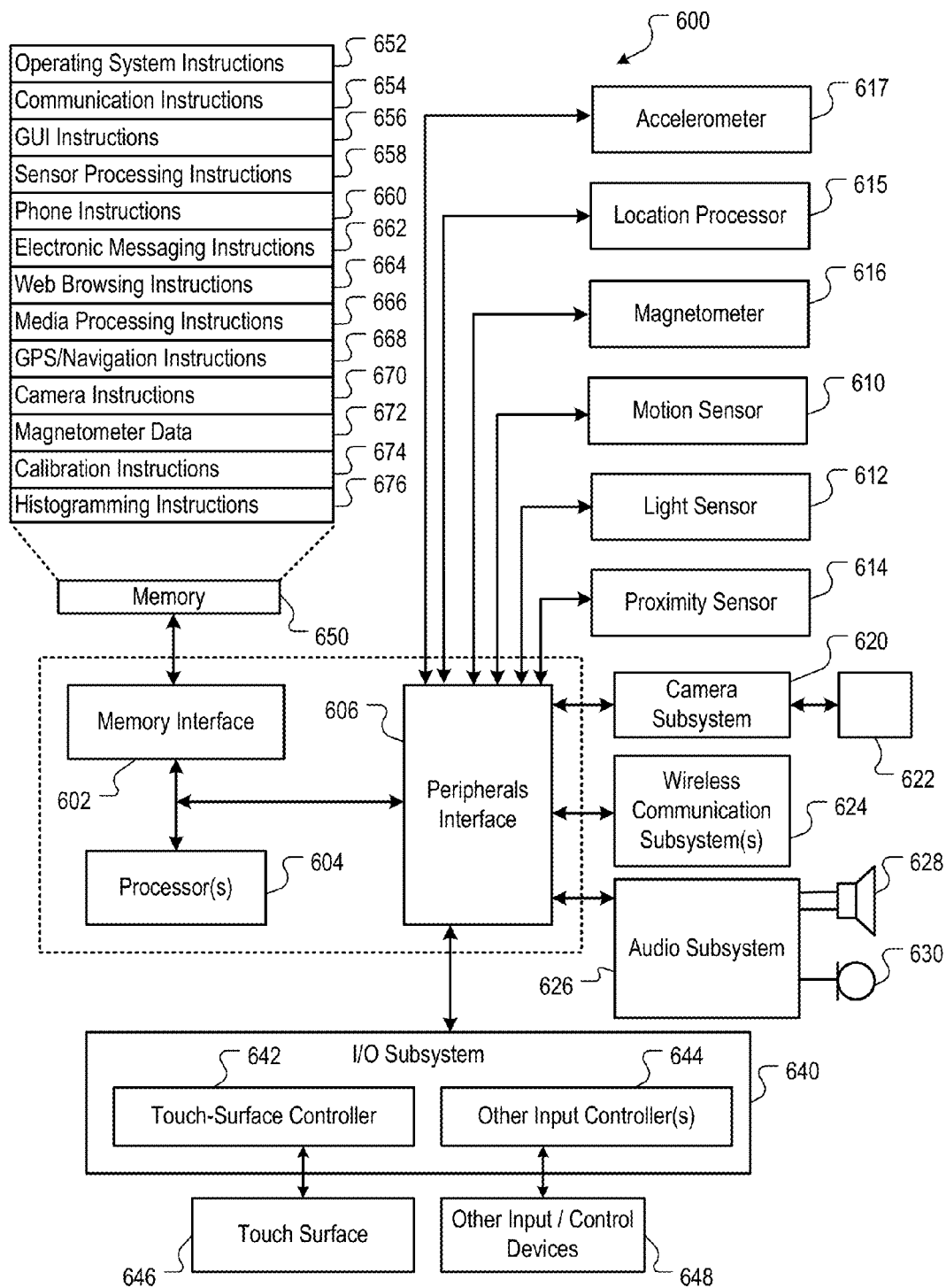
FIG. 6 is a block diagram of an example of a mobile device operated according to the technologies described above in connection with FIGS. 1-5.

FIG. 6 is a block diagram of an example of a mobile device 600 operated according to the technologies described above in connection with FIGS. 1-5. A mobile device can include memory interface 602, one or more data processors, image processors and/or processors 604, and peripherals interface 606. Memory interface 602, one or more processors 604 and/or peripherals interface 606 can be separate components or can be integrated in one or more integrated circuits. Processors 604 can include one or more application processors (APs) and one or more baseband processors (BPs). The application processors and baseband processors can be integrated in one single process chip. The various components in mobile device 600, for example, can be coupled by one or more communication buses or signal lines.

Sensors, devices, and subsystems can be coupled to peripherals interface 606 to facilitate multiple functionalities. For example, motion sensor 610, light sensor 612, and proximity sensor 614 can be coupled to peripherals interface 606 to facilitate orientation, lighting, and proximity functions of the mobile device. Location processor 615 (e.g., GPS receiver) can be connected to peripherals interface 606 to provide geopositioning. Electronic magnetometer 616 (e.g., an integrated circuit chip) can also be connected to peripherals interface 606 to provide data that can be used to determine the direction of magnetic North. Thus, electronic magnetometer 616 can be used as an electronic compass. Accelerometer 617 can also be connected to peripherals interface 606 to provide data that can be used to determine change of speed and direction of movement of the mobile device.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which a mobile device is intended to operate. For example, a mobile device can include communication subsystems 624 designed to operate over a GSM network, a GPRS network, an EDGE network, a Wi-Fi or WiMax network, and a Bluetooth network. In particular, the wireless communication subsystems 624 can include hosting protocols such that the mobile device can be configured as a base station for other wireless devices.

Audio subsystem 626 can be coupled to a speaker 628 and a microphone 630 to facilitate voice-enabled functions, such as voice recognition, voice replication, digital recording, and telephony functions.

I/O subsystem 640 can include touch surface controller 642 and/or other input controller(s) 644. Touch-surface controller 642 can be coupled to a touch surface 646 (e.g., a touch screen or touch pad). Touch surface 646 and touch surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 646.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In some implementation, a pressing of the button for a first duration may disengage a lock of the touch surface 646; and a pressing of the button for a second duration that is longer than the first duration may turn power to mobile device 600 on or off. The user may be able to customize a functionality of one or more of the buttons. The touch surface 646 can, for example, also be used to implement virtual or soft buttons and/or a keyboard, such as a soft keyboard on a touch-sensitive display.

In some implementations, mobile device 600 can present recorded audio and/or video files, such as MP3, AAC, and MPEG files. In some implementations, mobile device 600 can include the functionality of an MP3 player, such as an iPod™. Mobile device 600 may, therefore, include a pin connector that is compatible with the iPod. Other input/output and control devices can also be used.

Memory interface 602 can be coupled to memory 650. Memory 650 can include high-speed random access memory and/or non-volatile memory, such as one or more magnetic disk storage devices, one or more optical storage devices, and/or flash memory (e.g., NAND, NOR). Memory 650 can store operating system 652, such as Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers and/or one or more servers. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate Global Navigation Satellite System (GNSS) (e.g., GPS) and navigation-related processes and instructions; camera instructions 670 to facilitate camera-related processes and functions; magnetometer data 672 and calibration instructions 674 to facilitate magnetometer calibration. The memory 650 may also store other software instructions (not shown), such as security instructions, web video instructions to facilitate web video-related processes and functions, and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 650. Memory 650 can include histogramming instructions 676 that can include tiled zoom functions, and other related functions described with respect to FIGS. 1-5.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

Figure 7:
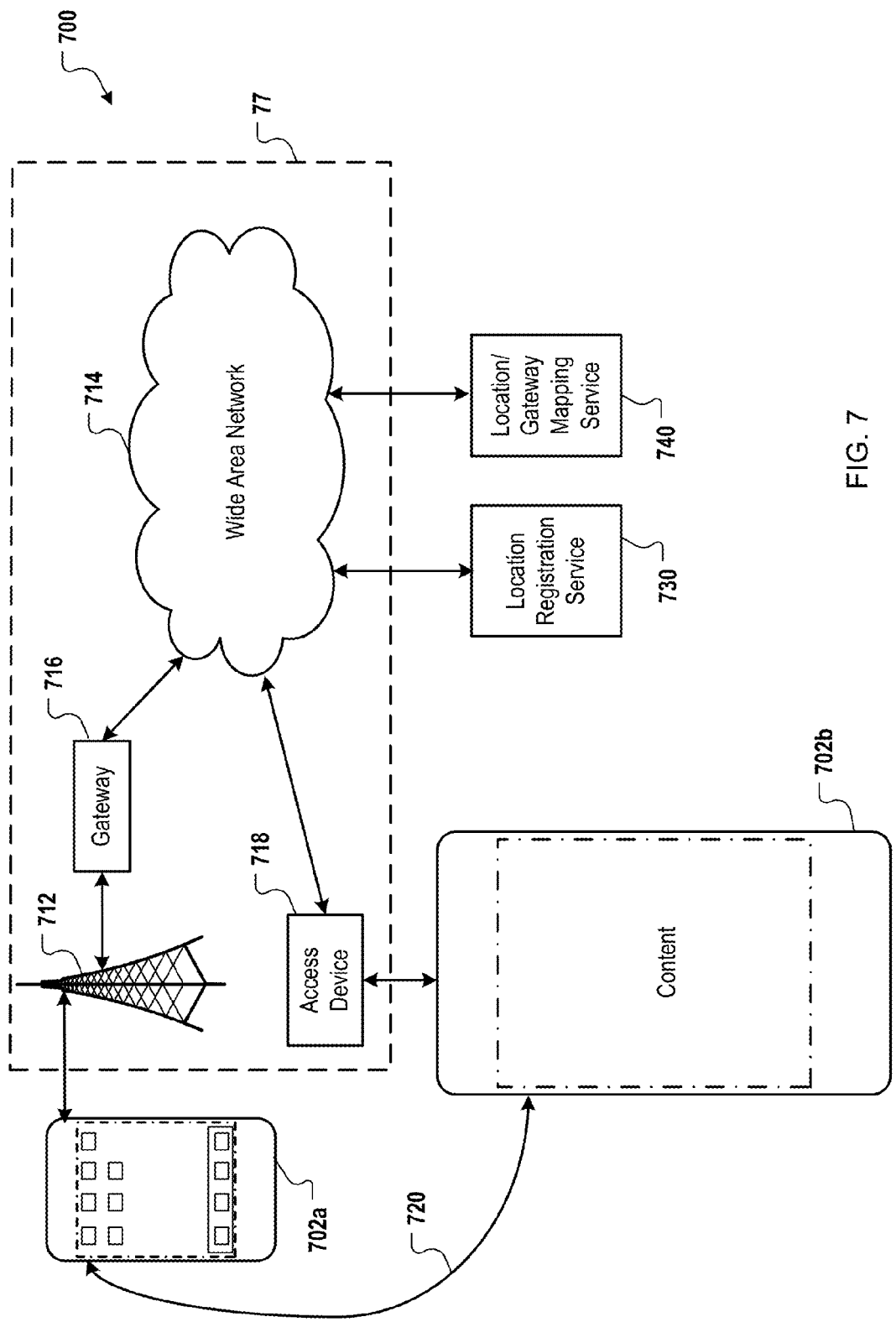
FIG. 7 is a block diagram of an example of a network operating environment for mobile devices operated according to the technologies described above in connection with FIGS. 1-5.

FIG. 7 is a block diagram of an example of a network operating environment 700 for mobile devices operated according to the technologies described above in connection with FIGS. 1-5. Mobile devices 702a and 702b can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access device 718, such as an 802.11g wireless access device, can provide communication access to the wide area network 714.

In some implementations, both voice and data communications can be established over wireless network 712 and the access device 718. For example, mobile device 702a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 712, gateway 716, and wide area network 714 (e.g., using Transmission Control Protocol/Internet Protocol (TCP/IP) or User Datagram Protocol (UDP)). Likewise, in some implementations, the mobile device 702b can place and receive phone calls, send and receive e-mail messages, and retrieve electronic documents over the access device 718 and the wide area network 714. In some implementations, mobile device 702a or 702b can be physically connected to the access device 718 using one or more cables and the access device 718 can be a personal computer. In this configuration, mobile device 702a or 702b can be referred to as a "tethered" device.

Mobile devices 702a and 702b can also establish communications by other means. For example, wireless device 702a can communicate with other wireless devices, e.g., other mobile devices 702a or 702b, cell phones, etc., over the wireless network 712. Likewise, mobile devices 702a and 702b can establish peer-to-peer communications 720, e.g., a personal area network, by use of one or more communication subsystems, such as the Bluetooth™ communication devices. Other communication protocols and topologies can also be implemented.

The mobile device 702a or 702b can, for example, communicate with one or more services 730 and 740 over the one or more wired and/or wireless networks. For example, one or more location registration services 730 can be used to associate application programs with geographic regions. The application programs that have been associated with one or more geographic regions can be provided for download to mobile devices 702a and 702b.

Location gateway mapping service 740 can determine one or more identifiers of wireless access gateways associated with a particular geographic region, and provide the one or more identifiers to mobile devices 702a and 702b for registration in association with a baseband subsystem.

Mobile device 702a or 702b can also access other data and content over the one or more wired and/or wireless networks. For example, content publishers, such as news sites, Really Simple Syndication (RSS) feeds, web sites, blogs, social networking sites, developer networks, etc., can be accessed by mobile device 702a or 702b. Such access can be provided by invocation of a web browsing function or application (e.g., a browser) in response to a user touching, for example, a Web object.

Implementations of the subject matter and the functional operations described in this specification can be configured in digital electronic circuitry, in tangibly-embodied computer software or firmware, in computer hardware, including the structures disclosed in this specification and their structural equivalents, or in combinations of one or more of them. Implementations of the subject matter described in this specification can be configured as one or more computer programs, i.e., one or more modules of computer program instructions encoded on a tangible nonvolatile program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be configured on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be configured in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more processes executing on a computer system, the method comprising:
    displaying a graphical representation of image data for a digital image, wherein the graphical representation comprises a first plurality of bins, wherein each bin represents one or more image data values, and wherein the graphical representation has a predetermined range that spans a first range portion and a second range portion;
    receiving first input requesting to increase a resolution of image data displayed in the first range portion, wherein increasing the resolution of image data displayed in the first range portion comprises representing a smaller number of image data values per bin than were previously represented before performing the act of increasing the resolution;
    in response to the received first input, modifying the display of the graphical representation to cause the resolution of the first range portion to increase, and to cause a resolution of the second range portion to decrease, wherein causing the resolution of the second range portion to decrease comprises representing a larger number of image data values per bin than were previously represented before performing the act of decreasing the resolution; and
    receiving second input to selectively adjust the digital image based on the modified displayed of the graphical representation of the image data; and
    adjusting the digital image based on the received second input.

2. The method of claim 1, further comprising:
    depicting resolved features of the increased resolution image data displayed in the first range portion that were unresolved in the first range portion prior to the resolution being increased,
    wherein the act of receiving second input to selectively adjust the digital image is further based on the resolved features of the increased resolution image data.

3. The method of claim 1, where the first and second range portions are mutually exclusive.

4. The method of claim 3, where the increased resolution first range portion and the decreased resolution second range portion are mutually exclusive.

5. The method of claim 1, where the graphical representation of the image data comprises a histogram of the image data, the histogram having a predetermined quantity of histogram bins.

6. The method of claim 5, where the digital image is a RAW image, the image data displayed in the first range portion is extended range data of the RAW image, and the first range portion comprises one bin corresponding to the last bin of the predefined quantity of histogram bins.

7. The method of claim 1, where the first range portion and the second range portion are adjacent.

8. The method of claim 7, where the sum of the first range portion and the second range portion equals a range of the image data.

9. The method of claim 1, where the image data is luminance.

10. The method of claim 1, where the image data is any one of R, G or B channels.

11. The method of claim 1, where the image data is a combination of R, G and B channels.

12. A system comprising:
a display device;
one or more computers and one or more storage devices storing instructions that are operable, when executed by the one or more computers, to cause the system to perform operations comprising:
displaying an indicator on the display device, the indicator representing a histogram of luminance associated with a digital image, the histogram indicator having a predetermined histogram range, the luminance including a luminance portion represented in the histogram indicator over a first histogram range, and another luminance portion represented in the histogram indicator over a second histogram range, the first and second histogram ranges having no overlap;
receiving user input requesting to expand the first histogram range over which the luminance portion is represented by a specified range;
in response to the received input, refreshing the histogram indicator while maintaining the predetermined histogram range, said refreshing the histogram indicator including,
expanding by the specified range the first histogram range over which the luminance portion is represented, and
compressing by the specified range the second histogram range over which the other luminance portion is represented, such that the expanded first histogram range and the compressed second histogram range have no overlap;
depicting resolved features of the luminance portion represented in the expanded first histogram range that were unresolved when the luminance portion was represented in the first histogram range; and
receiving user input to selectively adjust the digital image based on the resolved features of the luminance portion.

13. The system of claim 12, where the portion of the image data is extended data of the digital image, and the first histogram range comprises one bin at the upper end of the predetermined histogram range.

14. The system of claim 12, where the first histogram range and the second histogram range are adjacent.

15. The system of claim 14, where the sum of the first histogram range and the second histogram range equals the predetermined histogram range.

16. A non-volatile computer storage medium encoded with a computer program, the program comprising instructions that when executed by one or more computers cause the one or more computers to perform operations comprising:
determining that image data associated with a digital image includes predefined image data;
representing a histogram of the image data associated with the digital image, wherein the histogram comprises a first plurality of bins, wherein each bin represents one or more image data values, wherein a part of the histogram corresponding to the predefined image data is represented at a specified resolution over at least two adjacent histogram bins and another part of the histogram corresponding to the image data different from the predefined image data is represented at another resolution over at least two other adjacent histogram bins, wherein the specified resolution is different from the other resolution, and wherein resolution comprises the number of image data values represented per histogram bin; and
adjusting the digital image in response to received input.

17. The non-volatile computer storage medium of claim 16, where the operations further comprise
analyzing the predefined image data, and
specifying the resolution used to represent the part of the histogram corresponding to the predefined image data based on the analysis.

18. The non-volatile computer storage medium of claim 16, where the resolution used to represent the part of the histogram corresponding to the predefined image data is pre-specified.

19. The non-volatile computer storage medium of claim 16, where the image data is luminance, the predefined image data is the luminance having values larger than 1.0, and the image data different from the predefined image data is the luminance having values in a range 0.0-1.0.

20. The non-volatile computer storage medium of claim 19, where the operations further comprise:
determining that image data associated with another digital image only includes luminance values in the range 0.0-1.0; and
in response to said determining that the image data associated with the other digital image only includes luminance values in the range 0.0-1.0, representing the histogram of the luminance associated with the other digital image at a resolution that is between the specified resolution and the other resolution.

21. A system comprising:
a display device;
one or more computers and one or more storage devices storing instructions that are operable, when executed by the one or more computers, to cause the system to perform operations comprising:
determining that image data associated with a digital image includes image data values larger than 1.0;
in response to said determining, representing the image data associated with the digital image in a histogram indicator displayed on the display device, the histogram indicator having a predetermined quantity of histogram bins, each of the histogram bins corresponding to one or more image data values, such that a portion of the image data associated with the digital image that includes the image data values larger than 1.0 is represented over a specified quantity of the histogram bins that is greater than or equal to two histogram bins and less than a quantity of bins corresponding to a fraction of the predetermined quantity of histogram bins equal to a ratio of a range of the image data values larger than 1.0 to a total range of image data values included in the digital image;
depicting resolved features of the portion of the image data represented over the specified quantity of the histogram bins in the histogram indicator; and
receiving user input via a user interface control to selectively adjust the digital image based on the resolved features of the portion of the image data.

22. The system of claim 21, where a ratio of the specified quantity of the histogram bins to the predetermined quantity of histogram bins is pre-specified.

23. The system of claim 21, where the operations further comprise adaptively specifying a ratio of the specified quantity of the histogram bins to the predetermined quantity of histogram bins based on an amount of detail in the portion of the image data that includes the image data values larger than 1.0.

24. The system of claim 23, where the operations further comprise
assessing a small amount of detail in the portion of the image data that includes the image data values larger than 1.0, and
obtaining a first pre-specified ratio as a result of said adaptively specifying the ratio of the specified quantity of the histogram bins to the predetermined quantity of histogram bins.

25. The system of claim 23, where the operations further comprise
assessing a large amount of detail in the portion of the image data that includes the image data values larger than 1.0, and
obtaining a second pre-specified ratio as a result of said adaptively specifying the specified ratio of the quantity of the histogram bins to the predetermined quantity of histogram bins.

26. The system of claim 23, where the operations further comprise assessing the amount of detail in the portion of the image data that includes the image data values larger than 1.0 based on a relative quantity of the image data values larger than 1.0 with respect to the total range of image data values.

27. The system of claim 23, where the operations further comprise assessing the amount of detail in the portion of the image data that includes the image data values larger than 1.0 based on a distribution of the image data values larger than 1.0.

28. The system of claim 21, where the image data is luminance.

29. The system of claim 21, where the image data is one or more of R, G or B channels.

30. The system of claim 21, where the operations further comprise:
determining that image data associated with another digital image only includes image data values in a range from 0.0 to 1.0; and
in response to said determining that the image data associated with the other digital image only includes the image data values in the range from 0.0 to 1.0, representing the image data associated with the other digital image in the histogram indicator over the entire predetermined quantity of the histogram bins.

31. A non-volatile computer storage medium encoded with a computer program, the program comprising instructions that when executed by one or more computers cause the one or more computers to perform operations comprising:
determining that image data associated with a RAW digital image includes image data values in an extended range (1.0, 2.0];
representing a histogram of the image data associated with the RAW digital image over a predetermined quantity of histogram bins, each of the histogram bins corresponding to one or more image data values, such that a portion of the histogram of the image data associated with the RAW digital image corresponding to the extended range is represented over a specified quantity of the histogram bins that is greater than or equal to two histogram bins and less than half of the predetermined quantity of histogram bins;
depicting resolved features of the histogram portion of the image data associated with the RAW digital image corresponding to the extended range that is represented over the specified quantity of bins; and
in response to receiving input, selective adjusting the RAW digital image based on the resolved features of the histogram portion of the image data.

32. The non-volatile computer storage medium of claim 31, where said representing the histogram of the image data associated with the RAW digital image is such that another portion of the histogram of the image data of the RAW digital image that includes image data values in a non-extended range is represented over the remaining histogram bins from the predetermined quantity of histogram bins.

33. The non-volatile computer storage medium of claim 31, where the operations further comprise adaptively specifying a ratio of the specified quantity of the histogram bins to the predetermined quantity of histogram bins based on a characteristic of a portion of the image data associated with the RAW digital image that corresponds to the extended range.

* * * * *

UNITED STATES PATENT AND TRADEMARK OFFICE
CERTIFICATE OF CORRECTION

| | | |
|---|---|---|
| PATENT NO. | : 8,881,044 B2 | Page 1 of 1 |
| APPLICATION NO. | : 13/182747 | |
| DATED | : November 4, 2014 | |
| INVENTOR(S) | : Nikhil Bhatt | |

It is certified that error appears in the above-identified patent and that said Letters Patent is hereby corrected as shown below:

In the Claims

Column 22, Line 40 replace "modified displayed" with --modified display--.

Signed and Sealed this
Tenth Day of February, 2015

Michelle K. Lee
*Deputy Director of the United States Patent and Trademark Office*